United States Patent [19]
Reinheardt

[11] Patent Number: 5,652,964
[45] Date of Patent: Aug. 5, 1997

[54] PHOTOCHROMATIC VISOR FOR USE WITH A CRASH HELMET

[76] Inventor: Chadwick L. Reinheardt, 3555 S. Pacific Hwy. #1, Medford, Oreg. 97501

[21] Appl. No.: 638,363

[22] Filed: Apr. 26, 1996

[51] Int. Cl.⁶ ........................................................ A42B 3/22
[52] U.S. Cl. ........................................................ 2/424; 2/432
[58] Field of Search .................................. 2/6.3, 6.4, 6.5, 2/6.7, 424, 10, 432, 9, 15

[56] References Cited

U.S. PATENT DOCUMENTS

| | | | |
|---|---|---|---|
| 3,783,452 | 1/1974 | Benson et al. | 2/6.3 |
| 4,567,122 | 1/1986 | Baldry et al. | 2/432 |
| 4,748,696 | 6/1988 | Fohl | 2/424 |
| 5,014,366 | 5/1991 | Discipio, Sr. | 2/424 |
| 5,091,997 | 3/1992 | Foehl | 2/424 |

FOREIGN PATENT DOCUMENTS 2394261  2/1979  France ........................................ 2/424

*Primary Examiner*—Michael A. Neas

[57] ABSTRACT

A photochromatic visor for use with a crash helmet including a generally transparent plastic curved visor having an outer surface, an inner surface, and a photochromatic reagent added directly into the plastic to create a photochromatic piece, the visor further having an elongated central viewing portion and a tab integral with and extended outwards from each end thereof, the viewing portion bounded at an upper extent thereof by an upper edge and at lower extent thereof by a lower edge and with the upper edge having a radius of curvature less than that of the lower edge, and with each tab additionally including a through hole thereon and with the through holes of the tabs removably mated with visor connector sockets of a crash helmet.

3 Claims, 2 Drawing Sheets

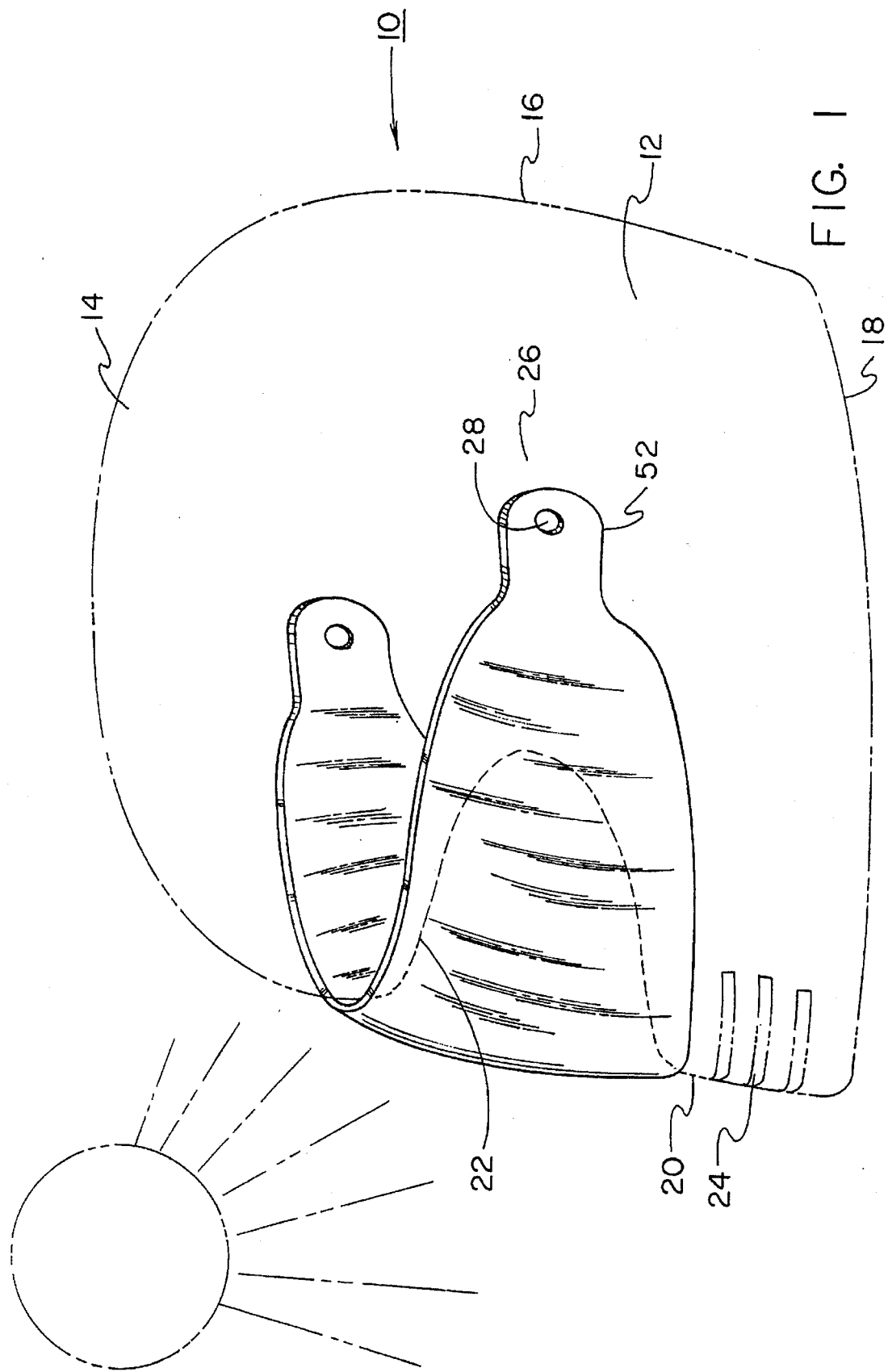

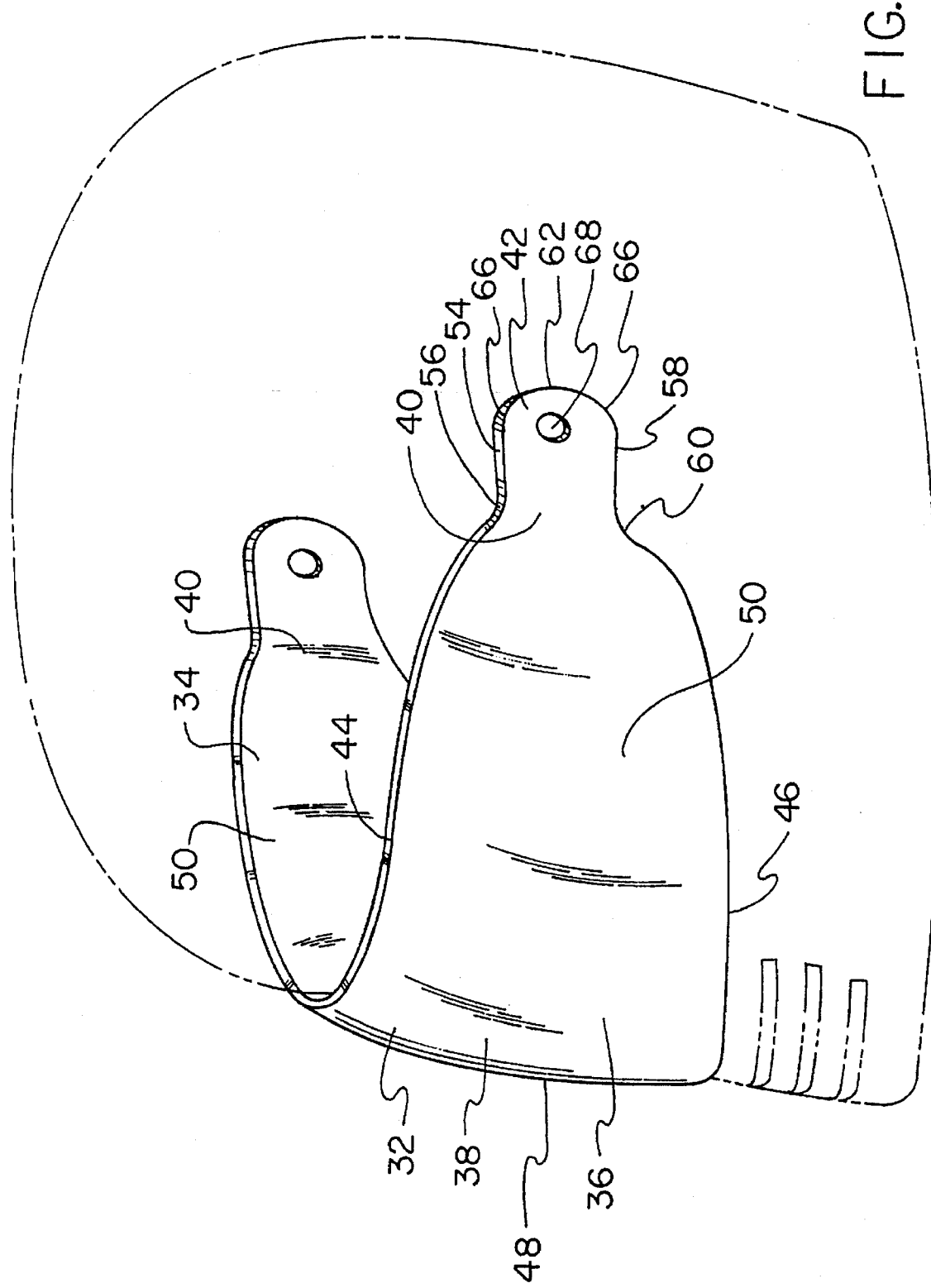

PHOTOCHROMATIC VISOR FOR USE WITH A CRASH HELMET

BACKGROUND OF THE INVENTION

1. Field of the Invention

The present invention relates to a photochromatic visor for use with a crash helmet and more particularly pertains to automatically adjusting light transmission to a user of the crash helmet based upon the intensity of light impinging thereupon with a photochromatic visor for use with a crash helmet.

2. Description of the Prior Art

The use of photochromatic materials is known in the prior art. More specifically, photochromatic materials heretofore devised and utilized for the purpose of automatically adjusting light intensity therethrough are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,475,080 to Shumway discloses a safety visor with polymethyl methylcrylate tinted sheets. U.S. Pat. No. 3,920,463 to Simms discloses a process for changing the tint of a photochromic material and material formed thereby. U.S. Pat. No. 4,757,034 to Prassas discloses lightly tinted glasses of variable transmission. U.S. Pat. No. 5,094,506 to Costa discloses a child's safety car seat windshield. U.S. Pat. No. 5,278,693 to Theisty et al. discloses tinted solution-phase electrochromic devices.

While these devices fulfill their respective, particular objective and requirements, the aforementioned patents do not describe a photochromatic visor for use with a crash helmet that allows a single visor to be utilized in conjunction with a crash helmet under varying lighting conditions.

In this respect, the photochromatic visor for use with a crash helmet according to the present invention substantially departs from the conventional concepts and designs of the prior art, and in doing so provides an apparatus primarily developed for the purpose of automatically adjusting light transmission therethrough to a user of the crash helmet based upon the intensity of light impinging thereupon.

Therefore, it can be appreciated that there exists a continuing need for new and improved photochromatic visor for use with a crash helmet which can be used for automatically adjusting light transmission therethrough to a user of the crash helmet based upon the intensity of light impinging thereupon. In this regard, the present invention substantially fulfills this need.

SUMMARY OF THE INVENTION

In the view of the foregoing disadvantages inherent in the known types of photochromatic materials now present in the prior art, the present invention provides an improved photochromatic visor for use with a crash helmet. As such, the general purpose of the present invention, which will be described subsequently in greater detail, is to provide a new and improved photochromatic visor for use with a crash helmet and method which has all the advantages of the prior art and none of the disadvantages.

To attain this, the present invention essentially comprises, in combination, a crash helmet formed of a generally dome-shaped rigid impact resistant shell. The shell has a hollow interior bounded by a rounded upper extent, a rearward extent, a lower edge extent defining an opening for allowing access to the interior for receiving a user's head, a frontal extent with an elongated oblong viewing port formed thereon for allowing a user a clear view and a plurality of vent slots formed thereon at a location below the viewing port for ventilating the interior, and a pair of opposed side extents with each side extent having a visor attachment socket integral therewith and with the visor attachment sockets aligned about a common axis of symmetry.

A generally transparent plastic curved visor is included. The visor has an outer surface, an inner surface, and a constant thickness defined between the inner surface and outer surface. The visor further has a photochromatic reagent added directly into the plastic to create a photochromatic piece. The photochromatic material darkens when exposed to light and lightens when light is removed. The visor further has an elongated and generally concave central viewing portion. A tab is integral with and extended outwards from each end of the viewing portion. The viewing portion is bounded at an upper extent thereof by an upper edge and at lower extent thereof by a lower edge. The upper edge has a radius of curvature less than that of the lower edge. The viewing portion further has a centroid and a central axis disposed therethrough in alignment with the centroid thereof. The central axis is positioned in perpendicular alignment with the edges of the viewing portion. The central axis divides the visor into two symmetrically opposed pieces. The viewing portion additionally has a characteristic width as measured along the central axis between the edges thereof.

Each tab of the visor has a generally u-shaped edge formed of an upper edge portion integral with the upper edge of the viewing portion at an upper bend, a lower edge portion parallel with the upper edge portion and integral with the lower edge of the viewing portion at a lower bend, and an outboard side edge portion extended between the edge portions to define a pair of rounded corners. The upper edge of the viewing portion has a length of about 14¾ inches as measured therealong between the upper bends. The lower edge of the viewing portion has a length of about 16½ inches as measured therealong between the lower bends. Each tab further has a width as measured along the outer surface thereof and as measured perpendicularly between the upper edge portion and lower edge portion that is approximately 30% of the characteristic width of the viewing section. Each tab additionally includes a circular through hole at central extent thereof. The through holes of the tabs are aligned about another common axis of symmetry and removably mated with the visor connector sockets of the crash helmet for allowing pivotal movement of the visor over and away from the viewing port.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved photochromatic visor for use with a crash helmet which has all the advantages of the prior art photochromatic materials and none of the disadvantages.

It is another object of the present invention to provide a new and improved photochromatic visor for use with a crash helmet which may be easily and efficiently manufactured and marketed.

It is a further object of the present invention to provide a new and improved photochromatic visor for use with a crash helmet which is of durable and reliable construction.

An even further object of the present invention is to provide a new and improved photochromatic visor for use with a crash helmet which is susceptible of a low cost of manufacture with regard to both materials and labor, and which accordingly is then susceptible of low prices of sale to the consuming public, thereby making such a photochromatic visor for use with a crash helmet economically available to the buying public.

Still yet another object of the present invention is to provide a new and improved photochromatic visor for use with a crash helmet which provides in the apparatuses and methods of the prior art some of the advantages thereof, while simultaneously overcoming some of the disadvantages normally associated therewith.

Even still another object of the present invention is to provide a new and improved photochromatic visor for use with a crash helmet for automatically adjusting light transmission therethrough to a user of the crash helmet based upon the intensity of light impinging thereupon.

Lastly, it is an object of the present invention to provide a new and improved photochromatic visor for use with a crash helmet comprising a generally transparent plastic curved visor having an outer surface, an inner surface, and a photochromatic reagent added directly into the plastic to create a photochromatic piece, the visor further having an elongated central viewing portion and a tab integral with and extended outwards from each end thereof, the viewing portion bounded at an upper extent thereof by an upper edge and at lower extent thereof by a lower edge and with the upper edge having a radius of curvature less than that of the lower edge, each tab additionally including a through hole thereon and with the through holes of the tabs removably mated with visor connector sockets of a crash helmet.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment secured to a crash helmet and in a darkened configuration in view of sunlight impinging thereupon.

FIG. 2 is yet another perspective view of the preferred embodiment of the present invention in a lightened configuration due to reduced light intensity impinging thereupon.

The same reference numerals refer to the same parts through the various Figures.

DESCRIPTION OF THE PREFERRED EMBODIMENT

With reference now to the drawings, and in particular, to FIG. 1 thereof, the preferred embodiment of the new and improved photochromatic visor for use with a crash helmet embodying the principles and concepts of the present invention and generally designated by the reference number 10 will be described.

The preferred embodiment of the present invention comprises a plurality of components. In their broadest context, such components include a crash helmet and visor. Such components are individually configured and correlated with respect to each other to provide a protected configuration, a visor that darkens when exposed to light and lightens when light is removed.

Specifically, the present invention includes a crash helmet. The crash helmet is formed of a generally dome-shaped rigid impact resistant shell 12. Preferably, the shell is formed of a hardened plastic. The shell has a hollow interior for holding a user's head. The interior of the shell is bounded by a rounded upper extent 14, a rearward extent 16 and a lower edge extent 18 defining an opening for receiving a user's head. The shell has a smooth outer surface and a cushioned inner surface for providing comfort to a user. A securable strap is provided for maintaining the helmet upon a user's head when in use. Additionally, the helmet has a frontal extent 20 and an elongated and oblong viewing port 22 formed thereon. The viewing port allows a user a clear view. Additionally, a plurality of vent slots 24 are formed on the frontal extent at a location below the viewing port. The vent slots are utilized for ventilating the interior for keeping a user's head cool and providing a fresh supply of air. The helmet also includes a pair of opposed side extents 26. Each side extent has a visor attachment socket 28 integral therewith. The visor attachment sockets are aligned about a common axis of symmetry.

A visor 30 is also provided. A visor is curved in shape and generally conforms with the front extent 20 of the crash helmet. The visor is formed of a generally transparent impact-resistant plastic material. The visor has an outer surface 32, an inner surface 34, and a constant thickness defined between the inner surface and the outer surface. One or more photochromatic reagents 36 are added directly into the plastic to create a photochromatic piece. The photochromatic piece darkens when exposed to light and lightens when light is removed. Photochromatic or photochromic reagents utilized with the plastic visor are well known and conventionally available.

Structurally, the visor has an elongated and generally concave central viewing portion 38 with oppositely opposed end extents 40. A pair of tabs 42 are also provided. Each tab is integral with and extended outwards from an end extent of the viewing portion. The viewing portion is bounded at an upper extent thereof by an upper edge 44 and at a lower extent thereof by a lower edge 46. The lower edge has a radius of curvature less than that of the lower edge. The viewing portion 38 also includes a centroid 48 and a central axis disposed therethrough that is positioned in alignment with the centroid. Additionally, the central axis is positioned perpendicular to the edges 44, 46. The central axis thus divides the visor into two symmetrically opposed pieces 50. The viewing portion also has a characteristic width. This characteristic width is defined along the central axis between the edges 44, 46.

Each tab of the visor has a generally U-shaped edge 52. Edge 52 is formed of an upper edge portion 54 integral with the upper edge 44 of the viewing portion at an upper bend 56, a lower edge portion 58 parallel with the upper edge portion 54 and integral with the lower edge 46 of the viewing portion at a lower bend 60, and an outboard side edge portion 62 extended between the edge portions to define a pair of rounded corners 66. Each rounded corner 66 has a radius of curvature less than that of the bends 56, 60. In addition, the upper edge of the viewing portion has a length of about 14¾ inches as measured therealong between the upper bends. The lower edge of the viewing portion has a length of about 16½ inches as measured therealong between the lower bends. Each tab also has a width as measured along the outer surface thereof and as measured perpendicularly between the upper edge portion 54 and the lower edge portion 58. This width is approximately 30% that of the characteristic width of the viewing section.

Each tab additionally includes a circular through hole 58 formed thereon at a central extent thereof. The through holes of the tabs are aligned about another common axis of symmetry. The through holes of the tabs are also removably mated with the visor connector sockets 28 of the crash helmet. In a mated configuration, the visor is positionable over and away from the viewing port 62. The visor has sufficient rigidity to retain its shape as essentially shown in FIG. 1 but the tabs 42 may be pulled slightly outward to facilitate coupling of the through holes with the visor connector sockets 28. In an alternate embodiment, the visor is formed of sufficient flexibility such that it retains a planar shape such as when positioned upon a flat planar surface.

The present invention is a crash helmet visor that is cable of adjusting the level of tinting automatically, based on the intensity of sunlight reaching it. The present invention is fabricated from conventional optical quality plastics that are treated to darken or tint with exposure to sunlight. The treatment process is permanent and will not wash off. The plastic is cut and molded to suit the individual application. Moveable and fixed visors and single or double pieced versions are equally feasible. This allows any crash helmet regardless of the work environment to be accommodated. Even helmets with integral face protecting hardware can be easily converted for utilizing the visor. Virtually any helmet for any sport involving eye protection makes an ideal setting for the utilization of the present invention.

To utilize the present invention, simply install it in place of the visor that is originally shipped with the helmet, preferably using the same coupling hardware. Then, whenever the visor is exposed to sunlight, it will darken accordingly to the intensity of the sun. As night approaches, the visor will slowly lighten and become clear with little or no tint.

The visor design precludes the need of a user from having to wear sunglasses under a helmet to shield his eyes. The present invention further eliminates the need to purchase two visors (clear and tinted) to accommodate the different times of day and/or changing lighting conditions. The present invention makes the transition from day to night viewing automatically, requiring no actions by the user. Finally, the present invention protects the user from flying debris and ultraviolet radiation. The present invention can also be utilized with snowmobile helmets or vehicle racing helmets.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A crash helmet and photochromatic visor system comprising, in combination:

a crash helmet formed of a generally dome-shaped rigid impact resistant shell, the shell having a hollow interior bounded by a rounded upper extent, a rearward extent, a lower edge extent defining an opening for allowing access to the interior for receiving a user's head, a frontal extent with an elongated oblong viewing port formed thereon for allowing a user a clear view and a plurality of vent slots formed thereon at a location below the viewing port for ventilating the interior, and a pair of opposed side extents with each side extent having a visor attachment socket integral therewith and with the visor attachment sockets aligned about a common axis of symmetry; and a generally transparent plastic curved visor having an outer surface, an inner surface, a constant thickness defined between the inner surface and outer surface, and a photochromatic reagent added directly into the plastic to create a photochromatic piece and with the photochromatic material darkening when exposed to light and lightening when light is removed, the visor further having an elongated and generally concave central viewing portion and a tab integral with and extended outwards from each end thereof, the viewing portion bounded at an upper extent thereof by an upper edge and at lower extent thereof by a lower edge and with the upper edge having a radius of curvature less than that of the lower edge, the viewing portion further having a centroid and a central axis disposed therethrough in alignment with the centroid thereof and in perpendicular alignment with the edges and with the central axis dividing the visor into two symmetrically opposed pieces, the viewing portion additionally having a characteristic width as measured along the central axis between the edges thereof, each tab having a generally u-shaped edge formed of an upper edge portion integral with the upper edge of the viewing portion at an upper bend, a lower edge portion parallel with the upper edge portion and integral with the lower edge of the viewing portion at a lower bend, and an outboard side edge portion extended between the edge portions to define a pair of rounded corners and with the upper edge of the viewing portion having a length of about 14¾ inches as measured therealong between the upper bends and lower edge of the viewing portion having a length of about 16½ inches as measured therealong between the lower bends, each tab further having a width as measured along the outer surface thereof and as measured perpendicularly between the upper edge portion and lower edge portion that is approximately 30% of the characteristic width of the viewing section, each tab additionally including a circular through hole at central extent thereof and with the through holes of the tabs aligned about another common axis of symmetry and removably mated with the visor connector sockets of the crash helmet for allowing pivotal movement of the visor over and away from the viewing port.

2. A photochromatic visor for use with a crash helmet comprising:

a generally transparent plastic curved visor having an outer surface, an inner surface, and a photochromatic reagent added directly into the plastic to create a photochromatic piece, the visor further having an elongated central viewing portion and a tab integral with and extended outwards from each end thereof, the viewing portion bounded at an upper extent thereof by an upper edge and at lower extent thereof by a lower edge and with the upper edge having a radius of curvature less than that of the lower edge, each tab additionally including a through hole thereon and with the through holes of the tabs removably mated with visor connector sockets of a crash helmet; and wherein each tab has a generally u-shaped edge formed of an upper edge portion integral with the upper edge of the viewing portion at an upper bend, a lower edge portion parallel with the upper edge portion and integral with the lower edge of the viewing portion at a lower bend, and an outboard side edge portion extended between the edge portions and with the upper edge of the viewing portion having a length of about 14¾ inches as measured therealong between the upper bends and lower edge of the viewing portion having a length of about 16½ inches as measured therealong between the lower bends.

3. A photochromatic visor for use with a crash helmet for automatically adjusting light transmission therethrough to a user of the crash helmet based upon the intensity of light impinging thereupon comprising:

a generally transparent plastic curved visor having an outer surface, an inner surface, a constant thickness defined between the inner surface and outer surface, and a photochromatic reagent added directly into the plastic to create a photochromatic piece and with the photochromatic material darkening when exposed to light and lightening when light is removed, the visor further having an elongated and generally concave central viewing portion and a tab integral with and extended outwards from each end thereof, the viewing portion bounded at an upper extent thereof by an upper edge and at lower extent thereof by a lower edge and with the upper edge having a radius of curvature less than that of the lower edge, the viewing portion further having a centroid and a central axis disposed therethrough in alignment with the centroid thereof and in perpendicular alignment with the edges and with the central axis dividing the visor into two symmetrically opposed pieces, the viewing portion additionally having a characteristic width as measured along the central axis between the edges thereof, each tab having a generally u-shaped edge formed of an upper edge portion integral with the upper edge of the viewing portion at an upper bend, a lower edge portion parallel with the upper edge portion and integral with the lower edge of the viewing portion at a lower bend, and an outboard side edge portion extended between the edge portions to define a pair of rounded corners and with the upper edge of the viewing portion having a length of about 14¾ inches as measured therealong between the upper bends and lower edge of the viewing portion having a length of about 16½ inches as measured therealong between the lower bends, each tab further having a width as measured along the outer surface thereof and as measured perpendicularly between the edge portions that is approximately 30% of the characteristic width of the viewing section, each tab additionally including a circular through hole at central extent thereof and with the through holes of the tabs aligned about another common axis of symmetry and removably mated with the visor connector sockets of a crash helmet for allowing pivotal movement of the visor in relation to the crash helmet.

\* \* \* \* \*